(12) United States Patent
Kunita et al.

(10) Patent No.: US 8,136,049 B2
(45) Date of Patent: Mar. 13, 2012

(54) IMAGE PROCESSING APPARATUS

(75) Inventors: Atsuko Kunita, Osaka (JP); Koji Yakushiji, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 993 days.

(21) Appl. No.: 11/865,936

(22) Filed: Oct. 2, 2007

(65) Prior Publication Data

US 2008/0079659 A1  Apr. 3, 2008

(30) Foreign Application Priority Data

Oct. 3, 2006  (JP) .................................. 2006-272256

(51) Int. Cl.
G06F 3/048  (2006.01)
(52) U.S. Cl. .......................... 715/810; 345/428; 345/581
(58) Field of Classification Search .............. 345/4, 428, 345/581; 715/810
See application file for complete search history.

(56) References Cited

U.S. PATENT DOCUMENTS

| | | | | |
|---|---|---|---|---|
| 4,761,642 A | * | 8/1988 | Huntzinger | 715/806 |
| 5,396,264 A | * | 3/1995 | Falcone et al. | 715/811 |
| 5,650,827 A | * | 7/1997 | Tsumori et al. | 725/59 |
| 5,821,928 A | * | 10/1998 | Melkus et al. | 715/809 |
| 7,319,388 B2 | * | 1/2008 | Ichinowatari | 340/540 |

FOREIGN PATENT DOCUMENTS

| | | |
|---|---|---|
| JP | 04-334180 | 11/1992 |
| JP | 05-019727 | 1/1993 |
| JP | 2001-242975 | 9/2001 |
| JP | 2006-091343 | 4/2006 |

* cited by examiner

*Primary Examiner* — William Bashore
*Assistant Examiner* — Gregory A DiStefano
(74) *Attorney, Agent, or Firm* — David G. Conlin; Steven M. Jensen; Edwards Wildman Palmer LLP

(57) ABSTRACT

The present invention provides an image processing apparatus which improves processing efficiency by allowing display of a message according to a usage status of a user and also has good operability. The image processing apparatus includes a setting section 9a for setting a display form of a message 13c. The user sets a display form, that is, display or nondisplay, display time, a color of a display pane, a shape of the display and a display position of the message 13c, to be more precise, from a setting screen capable of setting each kind of message 13c. In the case where "Nondisplay" is selected in selecting display or nondisplay of the message 13c, no setting thereafter is performed. In the case where "Display" is selected, the setting is performed as to all the items, such as the display time, color of the display pane, shape of the display and display position.

9 Claims, 10 Drawing Sheets

FIG. 3

| KIND OF MESSAGE | DISPLAY OR NONDISPLAY | DISPLAY TIME | DISPLAY FORMAT | | | MESSAGE | CONDITION |
|---|---|---|---|---|---|---|---|
| | | | COLOR OF DISPLAY PANE | SHAPE OF DISPLAY PANE | DISPLAY POSITION | | |
| TROUBLE CODE | DISPLAY | ↑ (12sec.) ↓ | RED | BOX | CENTER | E7-03<br>HDD TROUBLE | INHIBIT NONDISPLAY |
| CONFIRMATION | NON-DISPLAY | ↑ (—) ↓ | — | — | — | ERASE COUNT OF ALL DIVISIONS? | |
| ERROR | DISPLAY | ↑ (15sec.) ↓ | YELLOW | RHOMBUS | TOP | COMMUNICATION ERROR<br>COULD NOT TRANSMIT | SETTING AUTHORITY ONLY TO ADMINISTRATOR |
| INHIBITION | DISPLAY | ↑ (8sec.) ↓ | BLUE | ELLIPSE | BOTTOM | CAN INPUT INTERNET FAX DESTINATION<br>INPUT OF E-MAIL DESTINATION IS NOT PERMITTED BY ADMINISTRATOR | |
| CAUTION | DISPLAY | ↑ (10sec.) ↓ | ORANGE | BALLOON | RIGHT | PASSWORD IS WRONG | SETTING AUTHORITY ONLY TO ADMINISTRATOR |

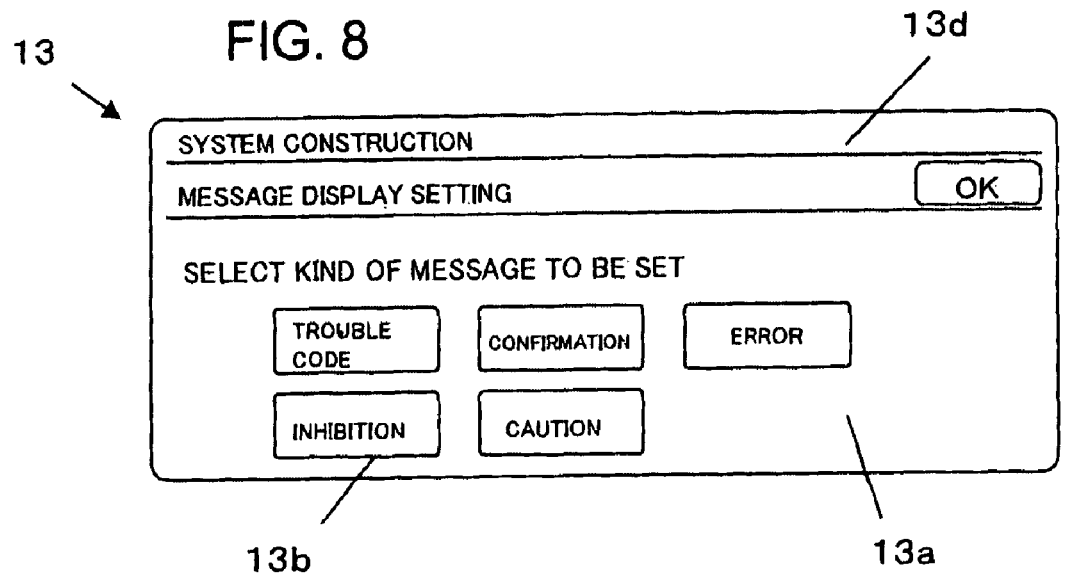
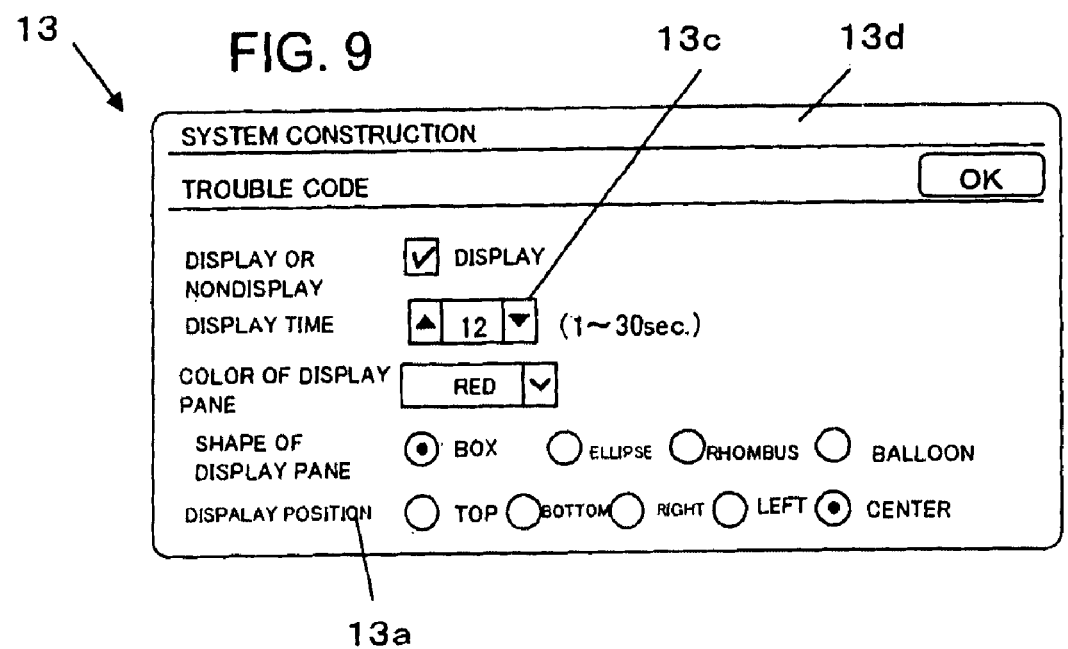

IMAGE PROCESSING APPARATUS

BACKGROUND OF THE INVENTION

1. Field of the Invention

The present invention relates to an image processing apparatus adapted to display a message to a user according to a state of the apparatus.

2. Description of the Related Art

An image processing apparatus performs a variety of image processing in a copy mode, a print mode, a scanner mode and a facsimile mode. Such an image processing apparatus includes an operation panel on which a user provides operating input for the sake of utilizing functions of the apparatus.

The operation panel includes a display screen which displays messages to be notified to the user, such as an abnormal state and an operating state of the image processing apparatus, operating input prohibition information or an error code as shown in FIG. 11. Japanese Patent Laid-Open No. 2006-91343 discloses a notification method for displaying such messages.

There are various messages, such as a trouble code, a confirmation, an error, a inhibition and a caution. However, all display forms of the messages such as display time have been set up to the same conditions.

However, there is optimal display time according to the message to be displayed. For instance, the message notifying an abnormality, a failure or the like needs to be displayed for a long time because the user must be notified thereof for a safety reason. As for the message prompting a caution, display for a short time is sufficient because it no longer needs to be displayed once recognized by the user. The message prompting a confirmation of an operation needs to be displayed for a long time when the user is unfamiliar with the operation. However, display for a short time is sufficient once the user gets used to the operation.

It has been known that the display time of the message is settable. As shown in FIGS. 12 to 14, however, setting of the display time covers all the messages so that only a uniform display time can be set, thereby causing inconvenience to the user who wants to change the display time according to the kind of message.

For instance, there is a problem that, in the case where all the messages are set to the display for a long time, the message prompting a caution of the user is also displayed for a long time so that the operating input cannot be provided and work does not progress. In the case where all the messages are set to the display for a short time, the message of an abnormality, a failure or the like which must be notified to the user is also displayed for a short time, so that the user may perform a wrong operation.

Some of the recent image processing apparatuses authenticate the user in view of the matter of security. In the operation related to the authentication of the user, and in particular to the authentication of the same user, the same confirmation message is displayed many times before a series of operations are completed. As the display screen is occupied by the message each time the message is displayed, the user cannot perform the operation until setup time passes and the message disappears. Under such circumstances, the display of the message has not been optimal for the user.

When developing a product, a manufacturer needed to be careful that the operation of the user would not become cumbersome due to excessive display of the messages. For instance, to avoid the excessive display of the messages, operating specifications preclude the message considered necessary for a certain user but obtrusive for another user out of the messages determined to be less important but absolutely necessary, that is, the messages prompting a confirmation and a caution of the operation and setting.

In view of the problems, it is an object of the present invention to provide an image processing apparatus which improves processing efficiency by allowing the display of the message according to a usage status of the user and also has good operability.

SUMMARY OF THE INVENTION

To attain the object, the present invention provides an image processing apparatus including: an operation panel including a display screen; a display section for displaying a main screen and a sub screen on the display screen; and a setting section capable of setting a different display form according to a kind of the sub screen, wherein the display section displays the sub screen in the display form set by the setting section.

According to the configuration, the user can change the setting of the display form of the sub screen classified into multiple kinds according to each kind of the sub screen to suit the usage status of the user, thus allowing optimal display for the user.

The image processing apparatus is the one wherein: the sub screen is for a message; and the display section superimposingly displays the message on the main screen.

Here, the message includes status information on the image processing apparatus, printed information or image information such as news. The sub screen may be displayed in a two-screen display state side by side with the main screen in addition to being superimposingly displayed on the main screen. Furthermore, multiple sub screens may be displayed.

According to the configuration, the user can change the display form according to the kind of message. The display form is changed so that the kind of message unnecessary for the user is displayed so as not to get in the way of the main screen when providing operating input or the like. The message necessary for the user is simply and appropriately displayed to the user. To be more specific, the message is displayed according to the usage status of the user. Thus, the user can efficiently perform an operation.

The image processing apparatus is the one wherein the setting section determines whether to permit or inhibit the change in the display form of the message according to the kind of message.

For instance, setting of the display form is determined to be inhibited in terms of safety of the user as to the message relating to a failure, that is, the message determined to be absolutely necessary for the user. The message notifying an operation condition or an operation procedure is changed according to the usage status of the user so as to improve operation efficiency. Therefore, the setting section permits the setting of the display form thereof. Thus, the user can safely use the image processing apparatus.

Here, a determination of whether to permit or inhibit the setting of the message is made according to the kind of message. For instance, in the case where the messages are classified into a trouble code, a confirmation, an error, an inhibition and a caution, the setting section prohibits the setting of the display form of the message classified into the trouble code.

The trouble code is the message wherein, when a trouble occurs to the image processing apparatus, before and upon reaching life of consumable goods, the image processing apparatus itself detects and analyzes the contents of the trouble so as to notify the user or a serviceman of the contents. To be more specific, the trouble code needs to be displayed so that the user or the serviceman can surely recognize it in order for the user or the serviceman to appropriately handle it. For that reason, the setting section inhibits the setting of the display form of the message classified into the trouble code. It is thereby possible to minimize a trouble, such as a stop of operation of the image processing apparatus.

The determination of whether to permit or inhibit the setting of the message is made according to the importance of the message. For instance, in the case where the importance of the messages is classified into high, medium and low, the setting section inhibits the setting of the display form in the case where the importance is high, permits the setting of the display form only to specific users in the case where the importance is medium, and permits the setting of the display form in the case where the importance is low.

Here, the importance is a degree of emergency of the information issued from the image processing apparatus or a degree of whether or not the information is necessary for the user. To be more precise, the message of high importance is the kind of message that absolutely needs to be notified to the user, such as a failure or a failure which needs to be repaired by the serviceman. The message of medium importance is the kind of message necessary for a clear understanding of operations for use by the user, such as an operating input procedure or the operation procedure. The message of low importance is the kind of message that is not especially necessary to be notified to the user.

The image processing apparatus is the one wherein the setting section sets the display form of the message, that is, to be more precise, setup items of display or nondisplay, display time and a display format (a color of a display pane, a shape of the display pane and a display position).

According to the configuration, for instance, it is possible, by setting the display time, to display the kind of message notifying an abnormality and the like of the image processing apparatus for a long time and display the kind of message prompting a caution and the like for a time period to be recognized by the user. As for the kind of message prompting a confirmation of the operation, the display time can be extended when the user is unfamiliar with the operation, that is, upon introduction of the image processing apparatus or the like. The display time can be changed to be shorter when the user gets used to the operation. Thus, the user can perform the operation with ease so that business can be efficient.

The user directly decides whether or not the message should be displayed by setting whether or not to display the message. Therefore, the user who repeatedly performs routine work can eliminate an obvious message in advance. For that reason, the user can go ahead with business without interruption.

Even if the message is nondisplay in this case, the display section displays the message of high importance out of the kinds of messages. For instance, in the case of the message notifying a serious failure of the image processing apparatus, the contents of the message are not conveyed if the display form is set to the nondisplay by the user. For that reason, there is a high possibility that a serious problem may occur. Thus, such a message must be displayed even in the case where the kind of message is set to the nondisplay.

These settings may also be allowed for each individual user. It becomes possible, by setting the items as to each individual user, to display the message necessary for each individual user apart from the messages normally used.

It is also possible, by setting the display format, to customize the display format of the message to suit the user's preference. Thus, each kind of message becomes the display suited to the user so that the user can recognize the contents of the message upon displaying the message.

The image processing apparatus is the one wherein, when setting a specific portion of the display form, the setting section only permits the setting from a specific user. Here, the specific portion is a predetermined kind of message or a setup item of the display form. The specific user is an administrator or a responsible person of the image processing apparatus.

According to the configuration, it is possible to prevent the display form of the necessary message from being set at a place of which the administrator or the responsible person as the specific user is not aware. To be more precise, the display form of the message notifying an error or prompting a caution of the user can only be set by the administrator or the responsible person while the user not permitted by the administrator or an insufficiently authorized user cannot set the display form of the message. Thus, the user can safely use the image processing apparatus.

The image processing apparatus is the one comprising a communication section for communicating with the external terminal, wherein, in the case where a change is made to the display form from the external terminal through the communication section, the setting section permits the setting.

The communication section can communicate with the external terminal connected to the outside via a network. According to the configuration, the user can perform the setting related to the message without going all the way to the image processing apparatus. The user can also simultaneously perform multiple settings of multiple image processing apparatuses which are connected to the network by the external terminal such as an administrative server. For that reason, the user can increase efficiency in the work of changing the settings.

When connecting to the image processing apparatus from the external terminal via the network, the user is authenticated by a password or the like. According to the configuration, it is possible to prevent the setting from anyone other than the user using the image processing apparatus and safely use the image processing apparatus.

BRIEF DESCRIPTION OF THE DRAWINGS

FIG. 3 is a diagram showing a list which is a display form of each kind of message according to the first embodiment;

FIG. 8 is a diagram showing the selection screen according to the second embodiment;

FIG. 9 is a diagram showing the screen for setting the display form of each kind of message according to the second embodiment;

DETAILED DESCRIPTION OF THE PREFERRED EMBODIMENTS

First Embodiment

Figure 1:
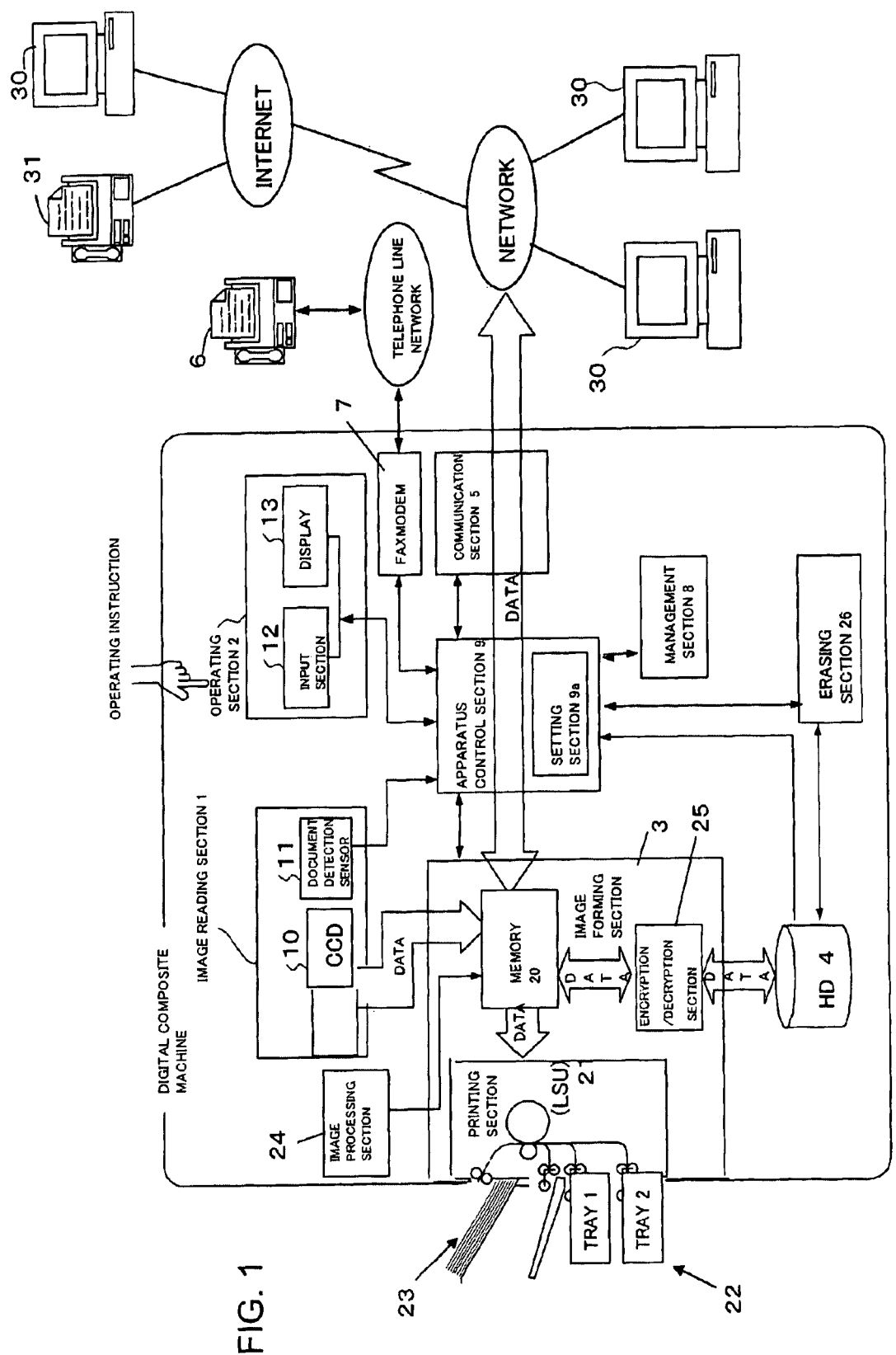
FIG. 1 is a diagram showing a skeleton framework of an image processing apparatus according to a first embodiment of the present invention.

FIG. 1 shows an image processing apparatus according to this embodiment. The image processing apparatus is a digital complex machine including a copy mode, a print mode, a scanner mode and a facsimile mode. The image processing apparatus includes an image reading section 1 for reading a document and inputting image data, an operating section 2 for receiving an input of the user, an image forming section 3 for printing inputted image data, a hard disk drive 4 for storing the image data, a communication section 5 for performing data communication with an external apparatus, a FAX modem 7 for performing communication with a facsimile apparatus 6, a management section 8 storing control information and configuration information on the entire apparatus, and a apparatus control section 9 composed of a CPU for controlling the entire apparatus.

The image reading section 1 functions as image data input section for inputting the image data, and includes an image pickup device such as a CCD 10 and a document detection sensor 11 which detects a document set on a document tray or an automatic document feeder (ADF). The image data on an image read by the CCD 10 is outputted to the image forming section 3.

Figure 2:
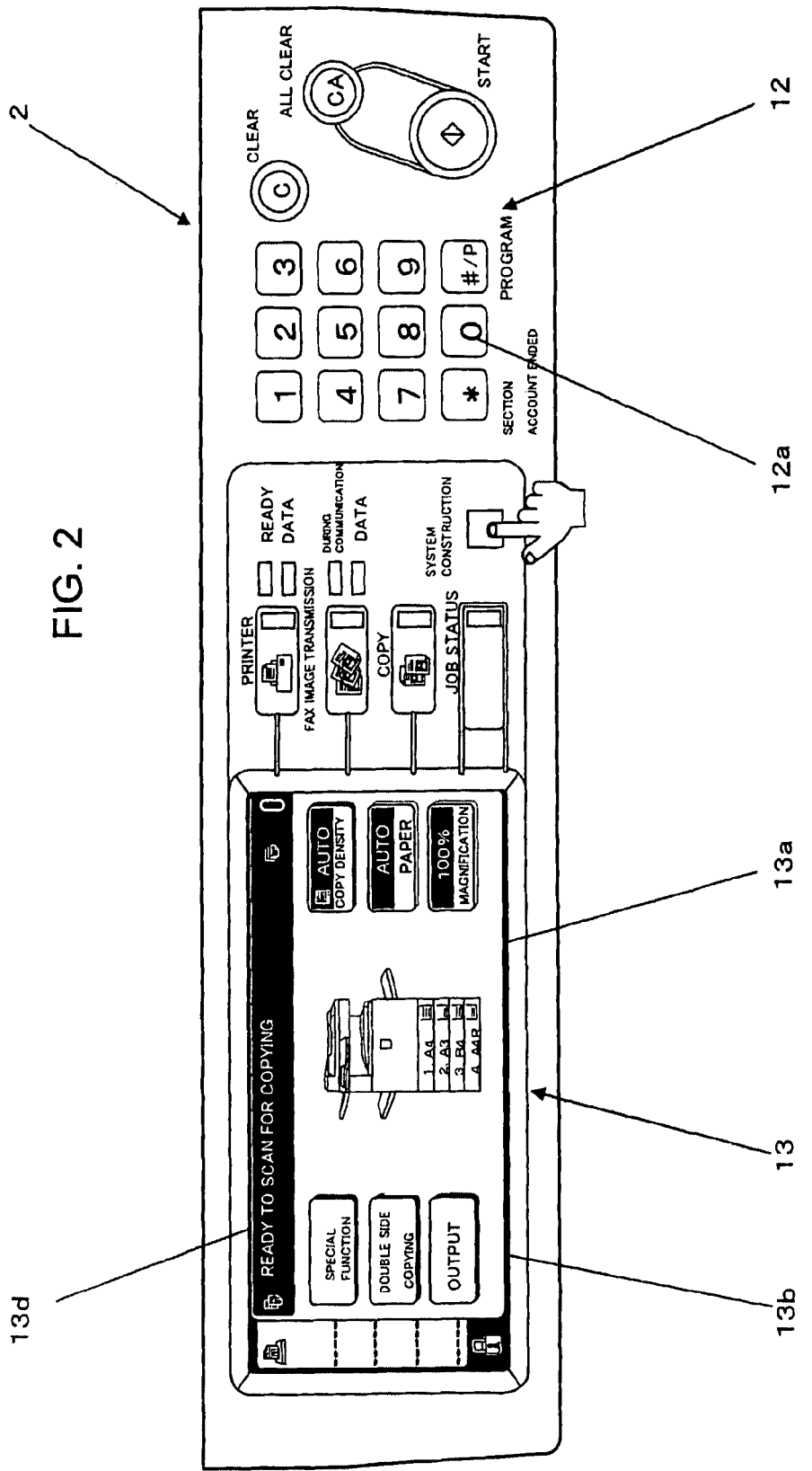
FIG. 2 is a diagram showing an operating section of the image processing apparatus according to the first embodiment.

The operating section 2 includes an operation panel as shown in FIG. 2. The operation panel includes an input section 12 composed of various input keys and a display 13 such as a liquid crystal display.

The input section 12 includes a fixed key 12a for performing various inputs. The fixed key 12a includes mechanical contacts, where the mechanical contacts are put in contact by pushing down the top of the fixed key 12a so as to perform conduction. A detection signal generated then is inputted to the apparatus control section 9. The apparatus control section 9 determines the operated fixed key 12a based on the detection signal, and outputs an operation signal corresponding to a function allocated to the fixed key 12a to the apparatus control section 9.

The display 13 includes a touch panel for receiving the input of the operation by touching a panel surface with a finger, a dedicated pen or the like and a liquid crystal display 13a for displaying the main screen and the sub screen. The display 13 has its drive controlled by the apparatus control section 9 so as to display the main screen and the sub screen 13c. The display 13 also includes a display-dedicated area 13d. The display-dedicated area 13d displays information notifying an operation condition or whether or not the operating section 2 is usable.

The main screen is a screen on which touch keys 13b and input contents of the touch keys 13b are displayed. The sub screen is a screen on which a message 13c such as the operation condition or a functional description is displayed. The touch keys 13b are a display of input keys for selecting the functions, such as designation of paper, scaling of a copy and printing density.

The image forming section 3 includes a memory 20 for storing inputted image data, a printing section 21 including a laser scanning unit, a paper feeding section 22 including a manual tray and a cassette tray, a paper ejection section 23 including a catch tray, an image processing section 24 and an encryption/decryption section 25.

The memory 20 uses a readable and writable semiconductor memory, such as an SDRAM or a flash memory. The memory 20 is divided into an area for storing inputted image data and an area for storing image data to be outputted. Instead of dividedly using one memory 20, it is also possible to use two memories 20 for input and for output respectively.

In the image forming section 3, the inputted image data is stored in the memory 20. The memory 20 stores the image data by overwriting old image data with new image data. The image data is subjected to image processing such as compression, extension and processing by the image processing section 24 so as to be stored in the memory 20. The image data having been subjected to the image processing is outputted to the printing section 21, the hard disk drive 4 or the apparatus control section 9. The printing section 21 prints the image on a recording sheet supplied from the paper feeding section 22 based on the image data stored in the memory 20. Thus, the image forming section 3 functions as processing section for processing the image data.

The communication section 5 is connected to a router, a switching hub and the like via a LAN cable, and is connected to a network formed by external terminals 30 such as personal computers and servers. The network is connected to the Internet via a communication line such as a telephone line network or an optical fiber. The communication section 5 sends and receives the data to and from the external terminals 30 in the network, and also sends and receives the data and e-mail to and from the external terminals 30 through the Internet. Furthermore, the communication section 5 performs Internet facsimile communication with a facsimile apparatus 31 through the Internet. The FAX modem 7 is connected to the telephone line network via a telephone line, and performs facsimile communication with the external facsimile apparatus 6.

The communication section 5 and the FAX modem 7 receive and input the image data from the external apparatuses, such as the external terminals 30 and facsimile apparatuses 6 and 31. To be more specific, they function as image data inputting section. When inputting the image data from the external apparatuses, the communication section 5 simultaneously receives the input of the operating instructions so as to also function as input section. Furthermore, the communication section 5 and the FAX modem 7 perform a process of transmitting the image data to the external apparatuses and thereby function as processing section.

The apparatus control section 9 executes a job to the inputted image data. To be more specific, the apparatus control section 9 controls each of the sections and processes the inputted image data based on the information stored in the management section 8 according to the input from the operating section 2 and data input from the external apparatuses. Upon execution of the job, one of the copy mode, print mode, scanner mode and facsimile mode is executed according to the inputted image data so that the image is outputted in a desired form.

The apparatus control section 9 controls operation of each of the sections based on an operating command inputted from the fixed key 12a or the touch keys 13b, and also provides an instruction to display an operation screen according to the operation condition on the liquid crystal display 13a. The liquid crystal display 13a places the touch keys 13b and the message 13c based on an instruction from the apparatus control section 9 so as to display them on the liquid crystal display 13a.

The apparatus control section 9 includes a setting section 9a for setting a display form of the message 13c. The message 13c is the information to be notified to the user. Each of the messages 13c is stored in the memory 20 according to the kind thereof. The kinds of the messages 13c are a trouble code, a confirmation, an error, a prohibition and a caution.

The setting section 9a includes a management table for managing the display form of the message 13c as shown in FIG. 3. In the management table, the display form is recorded as to each kind of the message 13c. Setup items of the display form related to each kind of the message 13c are display or nondisplay, display time, color of the display pane, shape of the display pane and display position.

Figure 4:
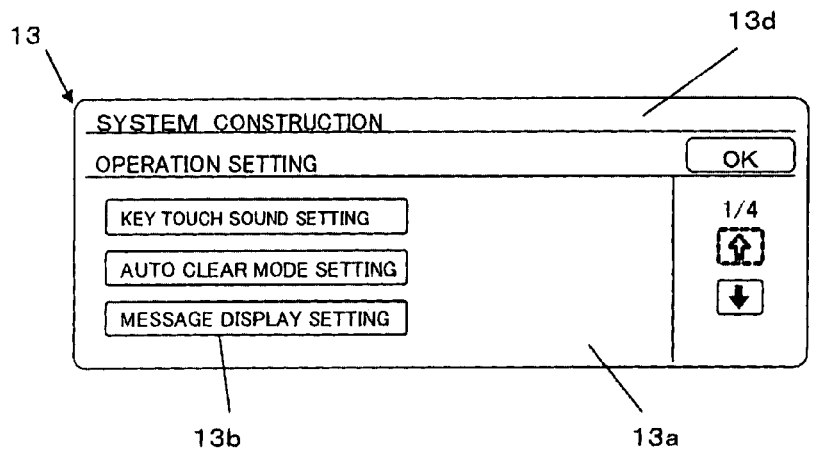
FIG. 4 is a diagram showing a selection screen according to the first embodiment.
Figure 5:
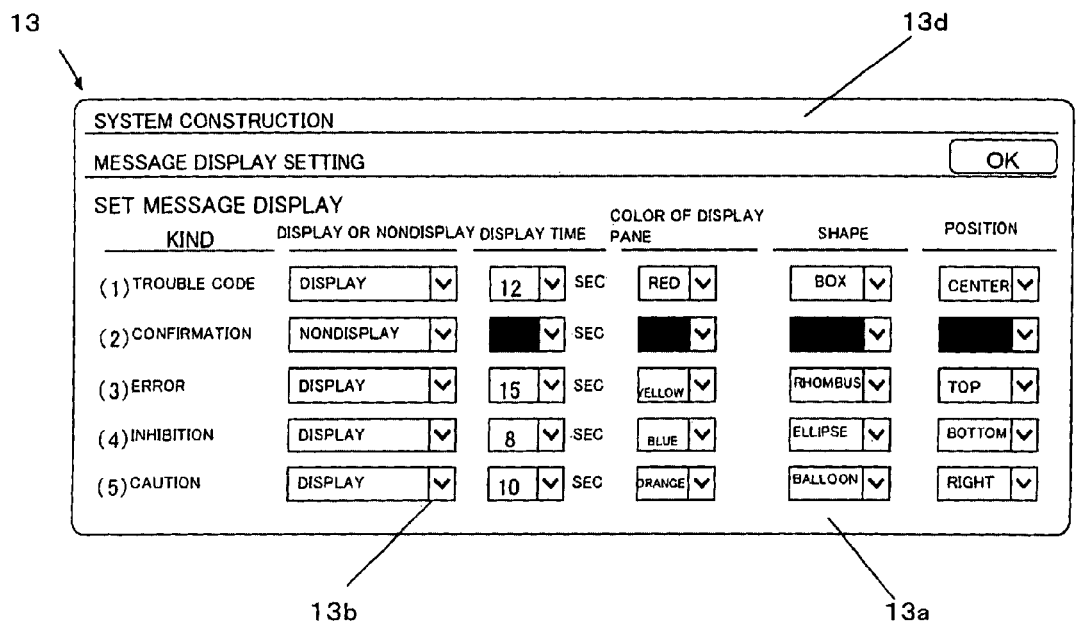
FIG. 5 is a diagram showing a screen for setting the display form of each kind of message according to the first embodiment.

To be more precise, as for a change in the display form, the setting of a message display is selected on a setting screen as shown in FIG. 4 so as to display the setting screen capable of setting each kind of message as shown in FIG. 5.

As for the selection of display or nondisplay of the message 13c, it is selectable whether or not to display the message 13c. When "Display" is selected, it is allowed to make a selection thereafter, that is, the display time, color of a display pane, shape of the display pane and display position. When "Nondisplay" is selected, the setup kind of the message 13c is not displayed at all. Therefore, other setup items cannot be set up.

However, "Nondisplay" is not selectable as to the message 13c which is displayed in the case of a failure accompanying danger for the user, a failure of a motor or a substrate or a failure requiring a repair by a serviceman. Also, "Nondisplay" is not selectable as to the message 13c of which display is considered essential to the user, such as the message 13c of confirmation "Do you acknowledge that all the settings of the system construction are factory defaults?" Even in the case where all the messages 13c of confirmation are set to "Nondisplay," only the message 13c will certainly be displayed on the liquid crystal display 13a.

The display time is the time when the message is displayed on the display 13, which is settable according to the user's preference. The display time is settable between 1 and 30 seconds according to this embodiment. However, it is not especially limited thereto but may be set in an arbitrary range, such as 100 seconds, 1000 seconds and the like.

A display format of the message 13c is the shape of the message displayed on the liquid crystal display 13a, where the color of the display pane, shape of the display pane and display position can be arbitrarily changed as to each kind of the message 13c so as to allow the kind of the message 13c to be easily recognized.

The shape of the display pane is selectable out of a box, an ellipse, a rhombus and a balloon. Furthermore, the same shape of the display pane as a different kind of the message 13c is also selectable. As for the color of the display pane, one color is selectable out of red, yellow, orange, blue and green. However, only one color is selectable as to one kind of the message 13c. For that reason, the same color is not overlappingly used for a different kind of the message 13c.

The management table has an incidental condition recorded therein as to each kind of the message 13c. For instance, the importance of the message is recorded. The message has its importance set in three stages of high, medium and low according to the kind of message. The setting section 9a has the range of setting the display form limited according to the stage of the importance.

To be more precise, it is recorded that the selection of "Nondisplay" in display or nondisplay is inhibited as to the message 13c related to the trouble code of which importance is high. In that case, "Display" is recorded as an existing value while "Nondisplay" is rendered not selectable in a "display or nondisplay" field of the trouble code.

It is recorded that only the specific user, that is, the administrator or the responsible person of the image processing apparatus, for instance, is given setting authority as to the message 13c related to the error and caution of which importance is medium. In that case, "Display" is recorded as an existing value in the "display or nondisplay" field of the error and caution. In the case where "Nondisplay" is selected, a password is requested in order to check whether or not the operating input is that of the administrator. If the password is recognized, the "display or nondisplay" field is set to "Nondisplay."

The message 13c of which importance is low, that is, the message 13c not especially required to be notified to the user is not recorded since it is not limited.

In the management table, the kind of the message 13c or a specific portion related to the setup items of the display form is recorded. The specific portion is preset, and only the administrator can make a change to the specific section. To be more precise, in the case where the specific portion is "display or nondisplay" of the setup items, and if "Nondisplay" is selected as to all the messages 13c, the password is requested in order to check whether or not the operating input is that of the administrator. In the case where the specific portion is "error" as the kind of message, each time one of the setup items of the display form related to the error is set, the password is requested in order to check whether or not the operating input is that of the administrator.

Figure 6:
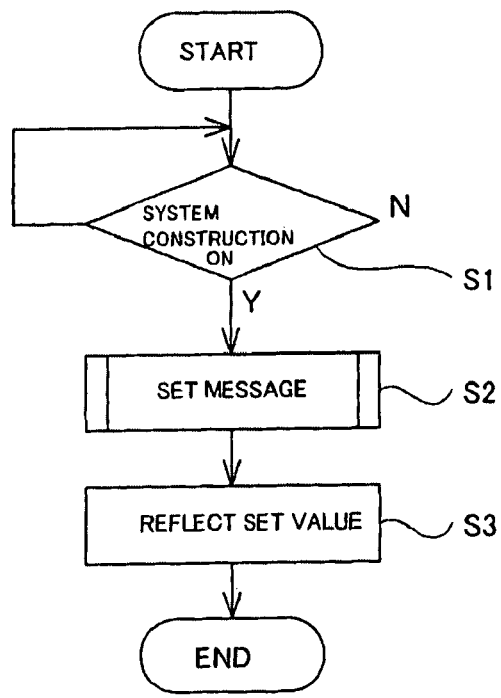
FIG. 6 is a flowchart for setting the display form of image data according to the first embodiment.
Figure 7:
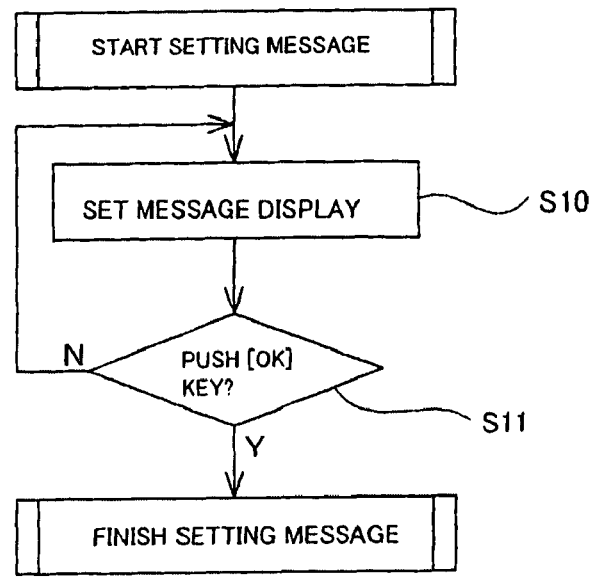
FIG. 7 is a flowchart for setting the display form of the image data according to the first embodiment.

Next, a method of setting the display form of the message 13c will be described by using the flowcharts of FIGS. 6 and 7.

The user provides the operating input from the fixed key 12a of the operating section 2. Thus, the apparatus control section 9 displays the setting screen as shown in FIG. 4 on the liquid crystal display 13a. If the user pushes the touch keys 13b of the system construction below the center of the setting screen displayed on the liquid crystal display 13a (S1), the apparatus control section 9 displays the display screen as shown in FIG. 5 on the display 13 (S2) In that case, as for each set value of each kind of the message 13c, the value set last time is displayed, such as the factory default in the case of setting the display form of the message 13c for the first time or the set value as set then is displayed in the case where the value has been set once.

The user sets the display form as to each kind of the message 13c. For instance, in the case of setting the message 13c of confirmation, the user sets display or nondisplay thereof first (S10). If "Display" is selected as to display or nondisplay, the user then sets the display time. And the user performs the setting in order of the color of the display pane, the shape of the display pane and the display position. If "Nondisplay" is selected as to display or nondisplay, the setting of the setup items thereafter is not performed.

In the case of setting the message of error, if "Display" is selected as to display or nondisplay, the user sets the display time next. And then, the user performs the setting in order of the color of the display pane, shape of the display pane and the display position. Here, in the case where the user sets display or nondisplay of setting the message 13c to "Nondisplay," the password is requested in order to check whether or not the operating input is that of the administrator. In the case where the user is the administrator, if the user inputs the password and has the password recognized, the "display or nondisplay" field is set to "Nondisplay." In the case where the user is not the administrator, either that password input is cancelled or the operation of the password input is finished by waiting until time elapses and it automatically returns to the setting screen.

Thus, once the setting of the display form is completed as to all kinds of the message 13c, the user pushes the touch key 13b of OK in the upper right of the setting screen as shown in FIG. 5 (S11). Upon detecting the input from the touch key 13b, the apparatus control section 9 updates the management table based on the changed contents and finishes the setting of the setup items of the display form. And the apparatus control section 9 recognizes the changed set value so that the display form of the message 13c is reflected (S3).

Second Embodiment

Next, a second embodiment will be described by using FIGS. 8 and 9. This embodiment is different from the first embodiment as to the method for changing the setting of the display form of the message 13c. As the image processing apparatus of this embodiment has the same configuration as the image processing apparatus of the first embodiment, the same sections are given the same symbols and a description thereof will be omitted.

In the setting method of the display form of the message 13c according to this embodiment, the display form is set according to the kind of the message 13c as shown in FIG. 8. To be more precise, the user selects the kind of the message 13c and sets the display form as to the selected kind of the message 13c.

For instance, in the case of setting the display form of the message 13c of the trouble code, if the user pushes the touch keys 13 of the trouble code on the setting screen as shown in FIG. 8, the setting screen as shown in FIG. 9 is displayed. And the display form is set from the setting screen.

As the method of setting the display form of the message 13c is the same as that in the first embodiment, a description of the method of setting the display form will be omitted.

Third Embodiment

Next, a third embodiment will be described by using FIG. 10. As the image processing apparatus of this embodiment has the same configuration as the image processing apparatus of the first embodiment, the same sections are given the same symbols and a description thereof will be omitted.

The first and second embodiments described the method of setting the display form of the message from the operating section 2 of the image processing apparatus. To set the display form of the message 13c, it is set from the display screen of the external terminal 30 connected by the network via a system construction screen of the Web (refer to FIG. 10) instead of going all the way to the place where the image processing apparatus is.

Figure 10:
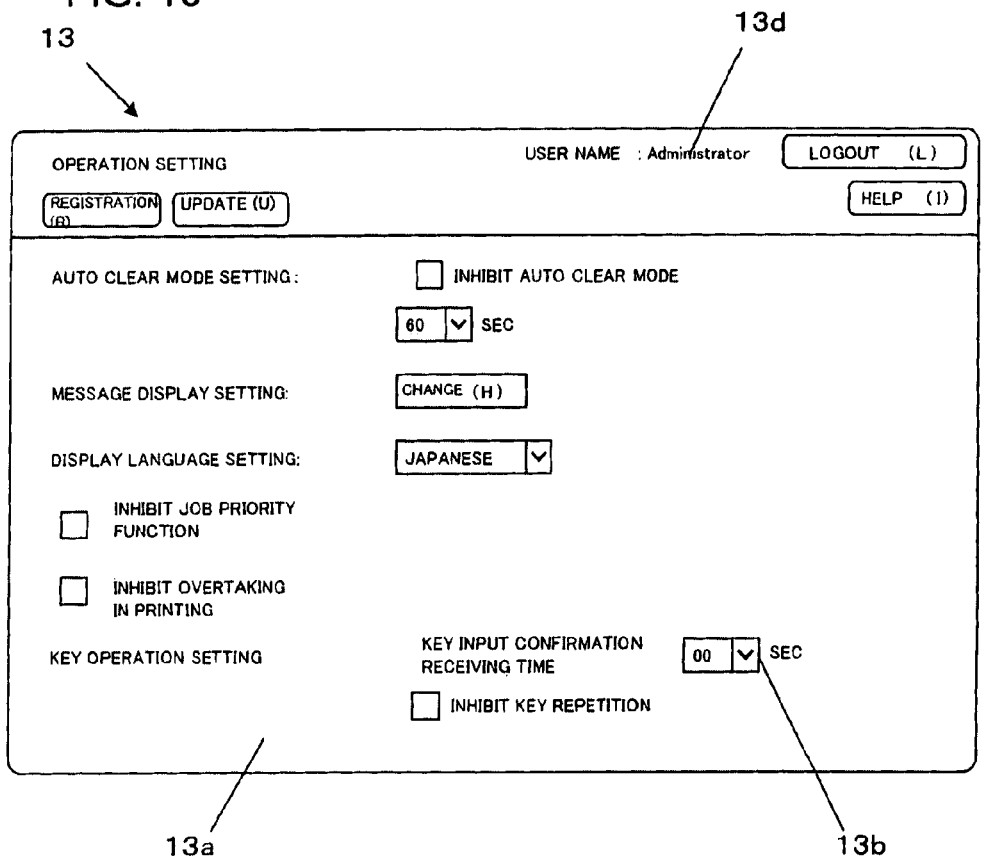
FIG. 10 is a diagram showing the screen for setting the display form of each kind of message according to the third embodiment.
Figure 11:
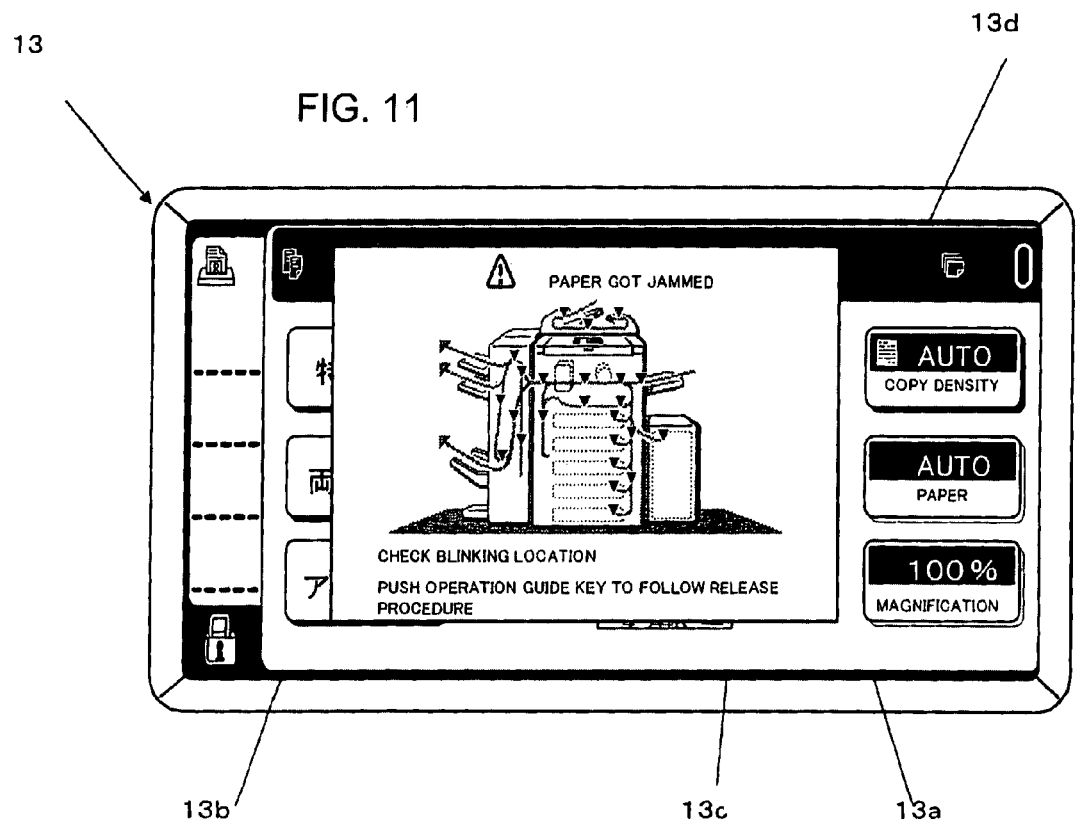
FIG. 11 is a diagram showing a display screen when a sub screen is displayed on a conventional main screen.
Figure 12:
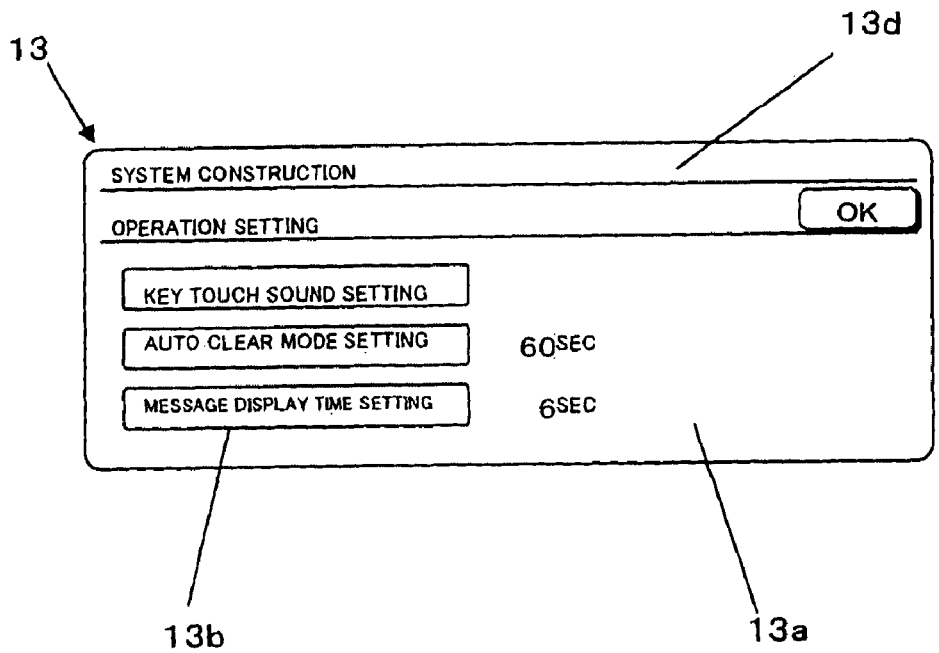
FIG. 12 is a diagram showing a conventional selection screen.
Figure 13:
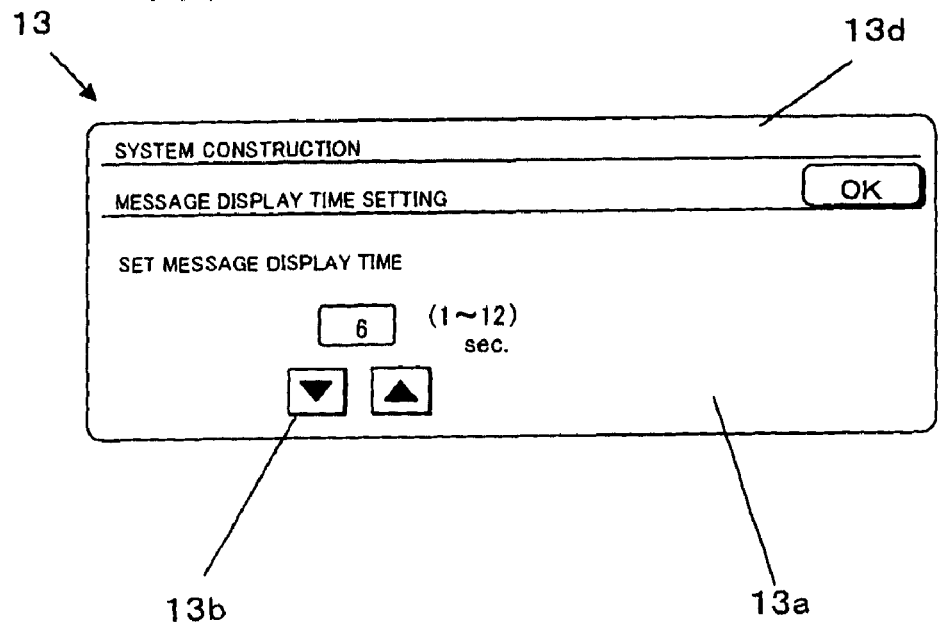
FIG. 13 is a diagram showing the screen for setting a display time of conventional sub screen.
Figure 14:
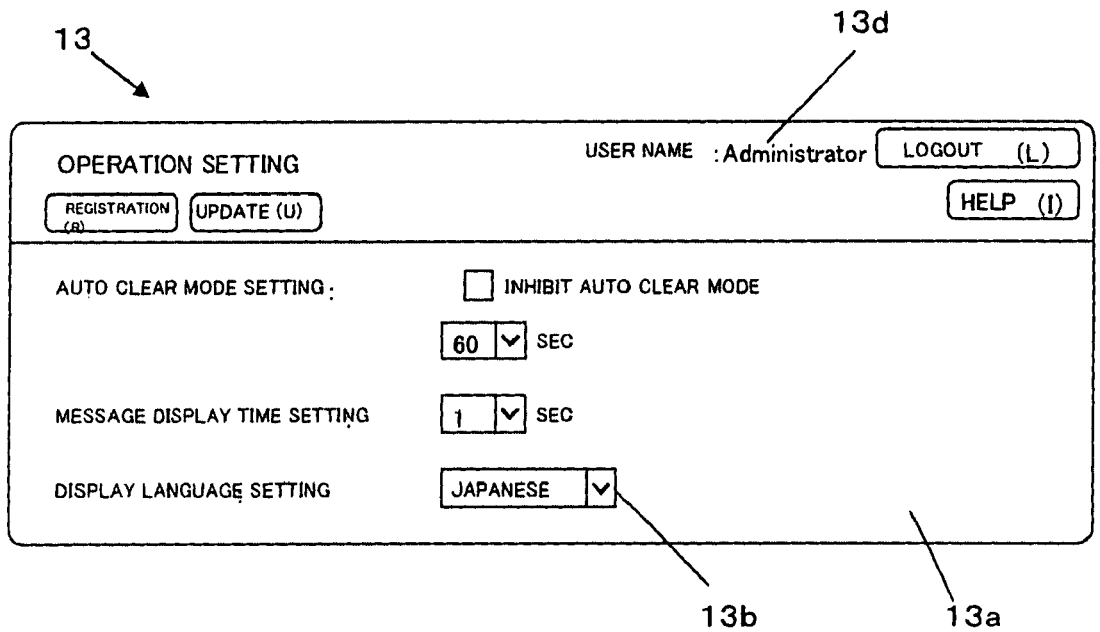
FIG. 14 is a diagram showing the screen for setting the display form of the message via a conventional Web screen.

Here, as an example of the method for setting the display form of the message 13c from the system construction screen of the Web displayed on the display screen of the external terminal 30, a list of the display forms of the message 13c as shown in FIG. 5 is displayed on the display screen as shown in FIG. 10 so as to perform the setting from the list of the display forms.

According to the configuration, the user can perform the setting of the message 13c without going all the way to the image processing apparatus. As the setting of the message 13c is performed via the system construction screen of the Web from the external terminal 30 which is connected by the network, the user can simultaneously perform the settings of multiple image processing apparatuses. For that reason, the user can increase efficiency in the work of the setting.

However, when connecting to the image processing apparatus from the external terminal 30 via the network, the apparatus control section 9 authenticates whether or not the connected external terminal is used by a registered user by means of the password or the like. According to the configuration, it is possible to prevent the setting from being changed by anyone other than the specific user and safely use the image processing apparatus.

Moreover, the present invention is not limited to the embodiments. As a matter of course, modifications and changes can be made within the scope of the invention. For instance, the present invention has been described by exemplifying the image processing apparatus which is a complex machine including a copier, a facsimile, a scanner and the like. However, the present invention is not limited thereto but is also applicable to a single apparatus, such as a facsimile apparatus, a scanner or a copier.

The description has been given as to the setting of the display form of the message from the external terminal connected to the network. It is also possible, however, to set the display form of the message via the Internet from a portable terminal, such as a cell-phone or a PDA. It is also possible to store the setting contents in a recording medium such as a USB memory, a CD or a DVD so that the image processing apparatus or the external terminal performs the setting by reading the stored setting contents from the recording medium.

According to the embodiment, the kinds of message are the trouble code, confirmation, error, inhibition and caution. However, the kinds of message are not limited thereto but may also be only the trouble code and error, or kinds other than the trouble code, confirmation, error, inhibition and caution may also be added.

According to the embodiment, the specific items changeable only by the specific user are preset. However, it is not limited thereto but it is also possible to render the specific items settable by the administrator and the user permitted by the administrator.

Furthermore, the password is adopted for confirmation of the administrator. However, it is not limited thereto but there are also various usable authentication methods, such as vein authentication, fingerprint authentication, facial recognition, corneal recognition, palm recognition and voiceprint recognition.

What is claimed is:

1. An image processing apparatus comprising:
an operation panel including a display screen;
a display section for displaying a main screen and a sub screen on the display screen, the sub screen configured to display multiple kinds of messages; and
a setting section capable of setting a different display form according to each kind of the sub screen,
wherein the display section displays the sub screen in the display form set by the setting section,
in a mode of setting the display form of a message, the setting section generates a setting screen having a plurality of options enabling a user to select the display form of the message including display or nondisplay, and the setting section determines whether to permit or inhibit the message to be set to nondisplay according to the kind of message, and in a case that the message is inhibited to be set to nondisplay, the message is displayed according to the selected display form even if the message is set to nondisplay.

2. The image processing apparatus according to claim 1, wherein the kinds of messages include a trouble code, a confirmation, an error, an inhibition and a caution;
   wherein when the message is classified into the trouble code, the setting section inhibits the change in the display form of the message to nondisplay, and
   when the message is classified into other than the trouble code, the setting section permits display or nondisplay of the message.

3. The image processing apparatus according to claim 1 wherein the setting section changes display time of the message.

4. The image processing apparatus according to claim 1, wherein the setting section determines whether to permit or inhibit the change in the display form of the message to display or nondisplay according to importance of the message.

5. The image processing apparatus according to claim 4, wherein the importance of the message is classified into high, medium, or low, and the setting section inhibits the change in the display form of the message to nondisplay in the case where the importance is high, permits the change in the display form to display or nondisplay only to a specific user in the case where the importance is medium, and permits the change in the display form to display or nondisplay in the case where the importance is low.

6. The image processing apparatus according to claim 1, wherein the setting section changes a display shape, a size, a color and a position of the message.

7. The image processing apparatus according to claim 1, wherein, when changing a specific section in the display form, the setting portion determines whether a user is a specific user or not by means of a password input, and the setting section permits only a change from the specific user.

8. The image processing apparatus according to claim 1, further comprising:
   a communication section for communicating with an external terminal,
   wherein, in the case where the display form is set from the external terminal via the communication section, the setting section permits the setting.

9. The image processing apparatus according to claim 1, wherein, when the kind of message which is inhibited to be set to nondisplay is set to display, the display portion displays the message according to the display form set by the setting portion.

* * * * *